Figure 3:
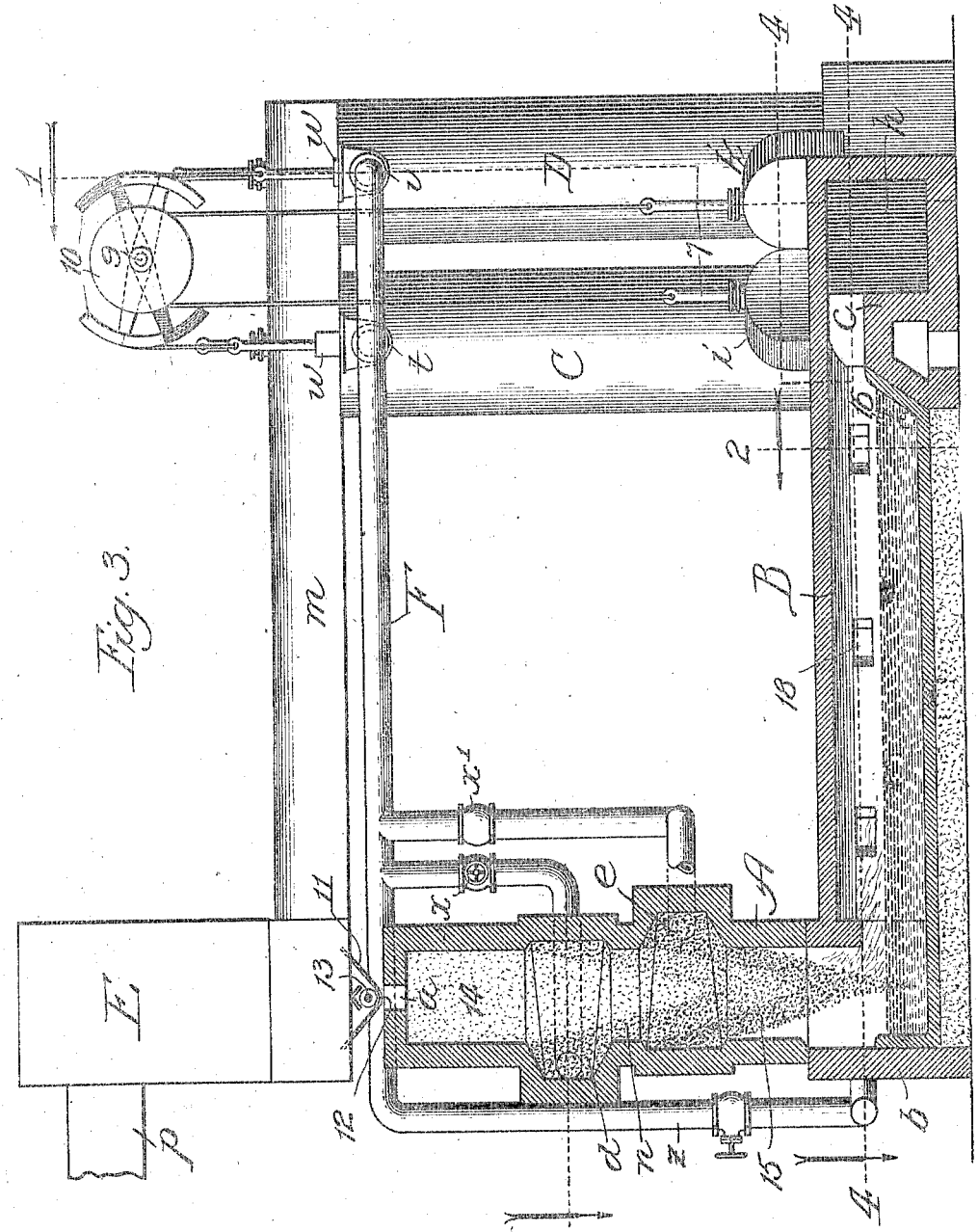

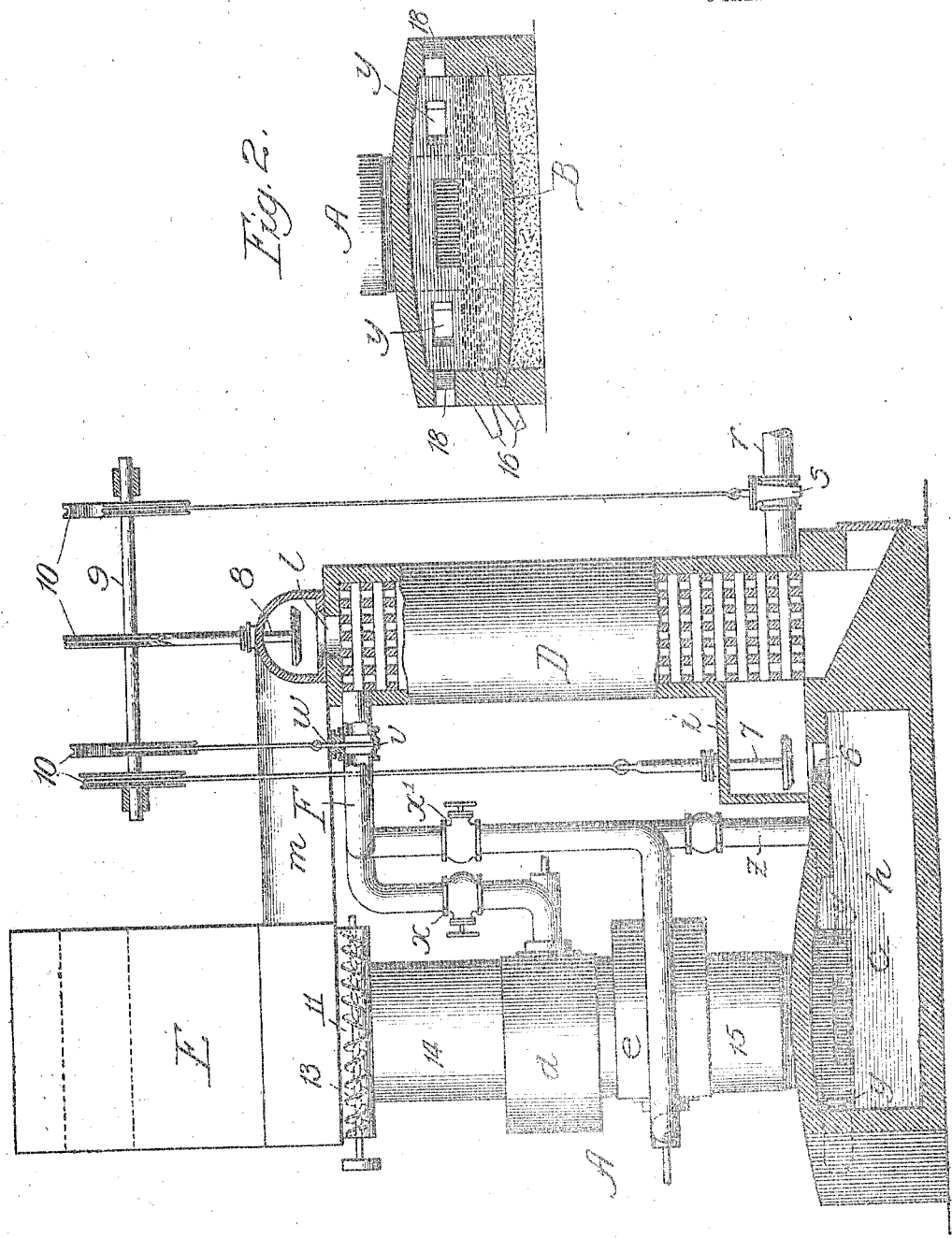

No. 817,415. PATENTED APR. 10, 1906.
H. F. BROWN.
ORE REDUCING FURNACE.
APPLICATION FILED OCT. 24, 1905.

3 SHEETS—SHEET 2.

Witnesses:
John Enders.
Chas H Snell.

Inventor:
Horace F. Brown,
By Dyrenforth, Dyrenforth & Lee,
Attys.

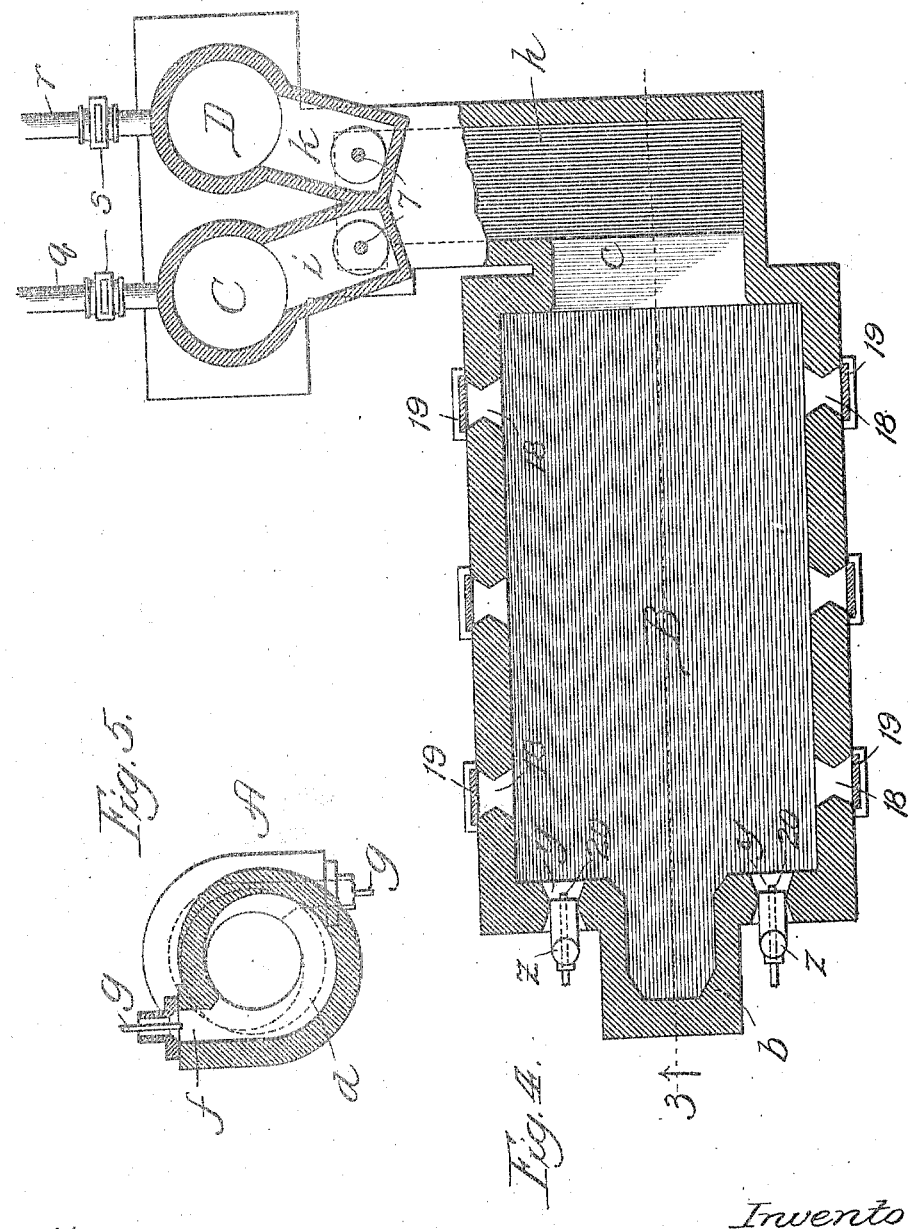

UNITED STATES PATENT OFFICE.

HORACE F. BROWN, OF CHICAGO, ILLINOIS.

ORE-REDUCING FURNACE.

No. 817,415. Specification of Letters Patent. Patented April 10, 1906.

Application filed October 24, 1905. Serial No. 284,239.

*To all whom it may concern:*

Be it known that I, HORACE F. BROWN, a citizen of the United States, residing at Chicago, in the county of Cook and State of Illinois, have invented a new and useful Improvement in Ore-Reducing Furnaces, of which the following is a specification.

My invention relates to improvements in the construction of furnaces for the treatment of finely-divided ores containing metal values and is well adapted for use in carrying out on a commercial scale the steps of an improved process of reducing ores forming the subject of a separate application, filed by me on the 24th day of October, 1905, Serial No. 284,238. The furnace is also well adapted for treating finely-divided ores by other steps than those of the process described and claimed in the said application.

In the practice of my improved process referred to the finely-divided ore to be treated is passed in a more or less segregated state and while in atmospheric suspension through a downdraft reducing-chamber provided in its upper end with one or more hydrocarbon-burners located, preferably, tangentially with reference to the chamber to produce a whirl of its hot products of combustion on entering, and thereby collect the segregated particles of ore by creating a vortex. The reducing fusing atmosphere starting at the burners and traveling in the downward direction with the ore melts the latter and changes the metallic oxids into metal. From the stack or reducing-chamber the ore falls directly and without subjection to an oxidizing atmosphere into a bath of molten slag and flows beneath the surface of the latter into a reverberatory chamber or forehearth. This chamber is provided with inlets for highly-heated air, which air mixes with the reducing-gases from the stack to produce more or less complete combustion, which further heats the bath to maintain it molten during separation of the metal from the slag-producing impurities beneath the protecting-covering of the surface portion of the bath.

My object is to provide a combined downdraft-stack and forehearth-furnace of comparatively simple and inexpensive construction capable of treating finely-divided ores efficaciously and in a continuous manner with peculiar economy in the matter of fuel consumption and operating expenses.

In the accompanying drawings I show my improved furnace of one desirable construction, adapting it, generally stated, for the treatment by smelting of finely-divided iron, copper, lead, and zinc ores, which may be in the form of flue-dust, mill-dust, fine concentrates, oxid-of-iron sands, and the like, and although for the most economical and satisfactory treatment of different ores various changes in details of construction and operation may be desirable the main features shown, either in the same or equivalent form, may be employed.

Referring to the drawings, Figure 1 is a view, partly in elevation, partly broken and partly in section, of my improved combined stack and forehearth-furnace provided with regenerators; Fig. 2, a broken view showing a section through the forehearth, taken on line 2 in Fig. 3 and viewed in the direction of the arrow; Fig. 3, a view partly in section and partly in elevation, the section being through the stack and forehearth on line 3 in Fig. 4; Fig. 4, a plan section taken in separate planes as indicated by the lines 4 4 in Fig. 3; and Fig. 5, a plan section of the stack, taken at one of the combustion-chambers on line 5 in Fig. 3.

A is a shaft or furnace-stack provided in its upper end with an ore-inlet $a$. The stack in the present construction rises from an end extension $b$ of a forehearth or reverberatory chamber B, terminating at a bridge-wall $c$. The stack is formed in the present construction with an upper enlargement $d$ and a lower enlargement $e$, separated by a restricted passage $n$, each said enlargement forming a combustion-chamber provided with a tangential inlet-opening $f$, fitted with a burner $g$, preferably for hydrocarbon gas or oil. Beyond the bridge-wall $c$ of the forehearth is an outlet-chamber $h$, communicating through conduits $i$ $k$ with the lower ends, respectively, of the regenerators C D. At their tops the regenerators have outlet-openings $l$, leading to a gas-outlet flue $m$, the said flue communicating with an ore-storage receptacle E, from which the gases discharge into an outlet-flue $p$. Entering the lower parts of the regenerators are compressed-air-supply pipes $q$ $r$, fitted with gate-valves $s$, and extending from the upper parts of the regenerators are air-outlet pipes $t$ $v$, which communicate with a common air-conduit F and are provided with gate-valves $w$. Air-supply pipes $x$ extend to the respective inlets $f$ of the combustion-chambers $d$ $e$. Entering the end of the forehearth or reverberatory chamber B at opposite sides of the extension $b$ are air-inlets $y$, to which extend air-conducting pipes $z$ from the conduit F. The conduits $i\ '\!k$ communicate with the space or chamber $h$ through openings 6, which are opened and closed by raising and lowering valves 7 of suitable construction. The gas-outlet openings $l$ are also opened and closed by means of raising and lowering valves 8 of suitable construction. Above the regenerators is a rock-shaft 9, provided with arms or pulleys 10, from which the valves $s$, $w$, 7, and 8 are suspended, as shown, in a manner to cause the gas inlet and outlet valves of one regenerator to open while those of the other regenerator close and to cause the air inlet and outlet valves of one regenerator to open when the gas-valves of the same regenerator close, and vice versa. The shaft 9 may be rocked, by a pull upon one of the valve-suspending cables shown, to actuate all the valves simultaneously, as described. The ore-storage receptacle E has a hopper-shaped base 11, provided with an opening 12, registering with the inlet-opening $a$ at the top of the stack A. In the said hopper portion of the receptacle is a feed-screw 13, operating in its rotation to feed finely-divided ore at a predetermined rate into the opening $a$.

Before commencing operations the burners $g$ should be started to heat the stack and forehearth structures to a high temperature, and a preparatory molten-slag bath should be present in the forehearth. The ore to be treated is fed in a finely-divided condition with additional finely-divided fluxing and slag-making material, if necessary, to the receptacle E, and when the feed-screw 13 is rotated the ore or mixture is fed at the desired rate through the openings $a$ to rain downward through the stack. Between the opening $a$ and upper combustion-chamber $d$ is a reduced preliminary ore-heating chamber 14, in which a more or less quiescent highly-heated atmosphere is maintained, and below the enlarged combustion-chambers $d\ e$ is a reduced heat-concentrating chamber 15.

The hot gases after passing through one of the regenerators move, as before stated, through the receptacle E to dehydrate the ore contents thereof. Therefore as the ore is fed through the opening $a$ the particles fall in a more or less segregated state through the preliminary-heating atmosphere in the upper reduced chamber 14, where they are quickly raised to a high temperature. When the particles reach the upper combustion-chamber $d$ they are enveloped by the flame from the upper burner $g$, which in whirling around under the force created by the tangential burner tends to create a vortex, which carries the particles around and gradually toward the center into approximate physical contact. This action upon the ore is enhanced by the lower burner $g$. The object of the reduced lower chamber 15 is to cause the ore and gases to descend without lateral expansion and consequent loss of heat, and one of the results of causing the fusing atmosphere entering the combustion-chambers to whirl, as described, is to cause the ore to descend out of contact with the wall of the lower heat-concentrating chamber 15 while surrounded by the hot gases of combustion. Valves $x'$ may be provided in the air-conducting pipes $x$ to limit the supply of oxygen to the burners $g$. In carrying out my aforesaid process highly-heated hydrocarbons from the burners and additional carbon fed with the ore, if necessary, will under the intense heat in the stack quickly deoxidize the metallic-oxid constituents of the ore as they melt, so that in practice the ore as it falls into the slag-bath in the chamber extension $b$ will be in a fluid or semifluid state, completely deoxidized, or substantially so. The draft from the burners $g$ is in a downward direction to the hearth B and thence over the bridge-wall to the regenerators, and the draft is augmented by currents of highly-heated air entering at the inlets $y$. The currents of hot products of combustion from the burners $g$ sweep around and around the interior wall of the stack as they descend, and the whirl thus given to the descending ore tends greatly to prolong the passage thereof through the stack and its subjection to the action of reducing-gases. As the reduced ore falls into the bath at the chamber extension $b$ the reducing-gases flow outward over the surface of the slag-bath and expand and mingle with the heated air-currents entering at the openings $y$. Thus the ore in entering the bath is shielded against any reoxidizing influence, and on striking the bath the metal constituent of the reduced ore sinks beneath the surface of the slag before it flows into the main chamber or forehearth. The mingling of the reducing-gases with the highly-heated air from the inlets $y$ tends to promote more or less complete combustion of the gases, with consequent generation of heat, which reverberates through the forehearth and further heats the entire bath. When the deoxidized ore moves from the chamber extension into the main body of the forehearth-bath, it is protected from the reoxidizing influence of the highly-heated air by the layer of molten slag, and the ore remains thus protected while the metal constituents separate by gravity from the slag-producing constituents of the ore.

The shaft 9 is rocked at desired intervals to open and close the air and gas inlet and outlet valves, as described, so that the gases from the forehearth pass alternately through the regenerators to heat the same, while the air-currents through the regenerators are caused to alternate with the gas-currents in the usual manner.

In the forehearth, adjacent to the bridge-wall c, is an upper tap-hole 16 for slag and a lower tap-hole 17 for metal. These tap-holes may be opened from time to time to draw off the slag and metal, or the drawing off may be continuous.

In the drawings I show openings 18 in opposite sides of the forehearth above the level of the bath, the openings being provided with doors 19. These openings permit inspection of the forehearth contents during operation, and when desired rabble-irons may be passed through them to stir the bath, should stirring at any time be deemed desirable.

My improved construction makes it possible to treat finely-divided ores in a practically continuous manner and with little or no material waste of the metal values. Comparatively little and in some cases no added fuel is necessary to maintain the furnace at its highest required efficiency, and its operations may be carried on with little expense for labor or repairs.

The stack A may be constructed with a single combustion-chamber, if desired, or more than two, and each such chamber may be provided with one or a plurality of burners placed tangentially, as shown, or otherwise, if desired. For the treatment of certain kinds of ore two combustion-chambers with a restricted passage between them, as shown, are preferable to one, for the reason, for example, that a very high temperature may be generated at the upper burner having little or no reducing atmosphere, while the lower combustion-chamber may be caused to develop an excess of active carbon gases to produce a strong reducing atmosphere.

While I show the stack at one end of the forehearth, it may be located at one side of or in any other suitable position with reference to the forehearth. Regenerators heated by the gases from the forehearth are desirable for the purpose of economy in heating the air fed to the furnace, and while I prefer to locate them as indicated, they may be placed in any other position with reference to the furnace proper or even dispensed with altogether without departing from the spirit of my invention as defined by the claims.

In Fig. 5 I show the hot-air-inlet openings y provided with hydrocarbon-burners 20, which may be employed during the stage of initially heating the furnace or when, for any reason, their operation would prove desirable. As before stated, I prefer that all the burners employed shall consume hydrocarbon oil or gas as the fuel; but my invention is not to be limited thereto, as any other means for producing the necessary fusing or heating atmosphere may be substituted therefor.

As before stated, the furnace may be employed for treating ores by other steps or chemical reactions than those described. For example, it may be employed for treating heavy sulfid ores where the required product is in the form of a copper or copper-nickel matte, and where the process would consist in partially desulfurizing the ore to permit slagging off of the excess iron, silica, and other impurities without subjecting the ore to any reducing action, or it may be employed for heating ores containing a smaller percentage of sulfids, where it is desirable to first oxidize the charge and then reduce the metallic contents, substantially as before described. I wish it to be understood, therefore, that my invention in its broadest sense is not to be limited to the treatment by any particular process of any particular class of ore.

While I show the forehearth extension as narrower than the main forehearth-chamber, with a shallow arch between the chamber and chamber extension, this construction may be varied, if desired, to cause the extension to be as wide as the main chamber. In the latter event the air-inlets may enter through the arch or through opposite side walls of the main chamber.

What I claim as new, and desire to secure by Letters Patent, is—

1. In a furnace for treating finely-divided ore, the combination of a downdraft-stack including, in series, an ore-feed opening, an enlarged combustion-chamber and a heat-concentrating chamber reduced in cross-section relative to said combustion-chamber, means for maintaining a fusing temperature in the combustion-chamber from which the ore and gases pass through said concentrating-chamber, wherein they are confined against lateral expansion, and a reverberatory forehearth into which said concentrating-chamber discharges and in which separation takes place of the metal values from the slag by gravity.

2. In a furnace for treating finely-divided ore, the combination of a downdraft-stack including, in series, a preliminary-heating chamber, an enlarged combustion-chamber and a heat-concentrating chamber reduced in cross-section relative to said combustion-chamber, means for feeding ore into said preliminary chamber, means for maintaining a fusing temperature in the combustion-chamber from which the ore and gases pass through said concentrating-chamber, wherein they are confined against lateral expansion, and a reverberatory forehearth into which said concentrating-chamber discharges and in which separation takes place of the metal values from the slag by gravity.

3. In a furnace for treating finely-divided ore, the combination of a downdraft-stack including, in series, an ore-feed opening, enlarged upper and lower combustion-chambers with a restricted passage between them, and a heat-concentrating chamber reduced in cross-section relative to said lower combustion-chamber, means communicating with each combustion-chamber for maintaining a fusing temperature therein, and a reverberatory forehearth into which said concentrating-chamber discharges and in which separation takes place of the metal values from the slag by gravity.

4. In a furnace for treating finely-divided ore, the combination of a downdraft-stack including, in series, a preliminary-heating chamber, enlarged upper and lower combustion-chambers with a restricted passage between them, and a heat-concentrating chamber reduced in cross-section relative to said lower combustion-chamber, means for feeding ore into said preliminary chamber, means communicating with each combustion-chamber for maintaining a fusing temperature therein, and a reverberatory forehearth into which said concentrating-chamber discharges and in which separation takes place of the metal values from the slag by gravity.

5. In a furnace for treating finely-divided ore, the combination of a downdraft ore-reducing stack provided in its upper end portion with an ore-feed opening and a reducing-atmosphere inlet beneath said opening, a forehearth into which the stack discharges, and means for maintaining a molten protecting-bath in said forehearth into which the reduced ore falls on entering and whereby the deoxidized metal is protected against oxidation while separating from slag-making impurities.

6. In a furnace for treating finely-divided ore, the combination of a downdraft ore-reducing stack provided in its upper end portion with an ore-feed opening and a reducing-atmosphere inlet beneath said opening, a forehearth into which the stack discharges, means for maintaining a molten protecting-bath in said forehearth into which the reduced ore falls on entering and whereby the deoxidized metal is protected against oxidation while separating from slag-making impurities, and means for supplying an oxidizing atmosphere to the forehearth beyond the path of entrance of ore from the stack to mix with and further combustion of the reducing-gases from the stack.

7. In a furnace for treating finely-divided ore, the combination of a downdraft ore-reducing stack provided in its upper end portion with an ore-feed opening, a preliminary-heating chamber beneath said opening and a reducing-atmosphere inlet beneath said chamber, a forehearth into which the stack discharges, and means for maintaining a molten protecting-bath in said forehearth into which the reduced ore falls on entering and whereby the deoxidized metal is protected against oxidation while separating from the slag-making impurities.

8. In a furnace for treating finely-divided ore, the combination of a downdraft ore-reducing stack provided in its upper end portion with an ore-feed opening and an enlarged combustion-chamber beneath said opening, a burner extending into the combustion-chamber at an angle to the center thereof, operating to direct a whirling reducing atmosphere into the stack, a forehearth into which the stack discharges, and means for maintaining a molten protecting-bath in said forehearth into which the reduced ore falls on entering and whereby the deoxidized metal is protected against oxidation while separating from slag-making impurities.

9. In a furnace for treating finely-divided ore, the combination of an ore-storage receptacle, a downdraft ore-reducing stack provided in its upper end portion with an ore-feed opening communicating with said receptacle, and a reducing fusing atmosphere inlet beneath said opening, a forehearth into which the stack discharges, means for maintaining a molten protecting-bath in said forehearth into which the reduced ore falls on entering and whereby the deoxidized metal is protected against oxidation while separating from slag-making impurities, regenerating means through which the forehearth gases pass, a gas-conduit extending from the said regenerating means into contact with the said receptacle to dehydrate the ore contents of the said receptacle, and means for passing air through the regenerating apparatus to the said reducing fusing atmosphere inlet and into the forehearth beyond the path of entrance of the ore from the stack, whereby a highly-heated oxidizing reverberatory atmosphere is caused to mingle in the forehearth with the reducing-gases from the stack.

HORACE F. BROWN.

In presence of—
A. U. THORIEN,
J. H. LANDES.